June 16, 1942.  M. J. WEBER  2,286,883
PHOTO-MECHANICAL APPARATUS
Original Filed Dec. 21, 1938    5 Sheets-Sheet 1
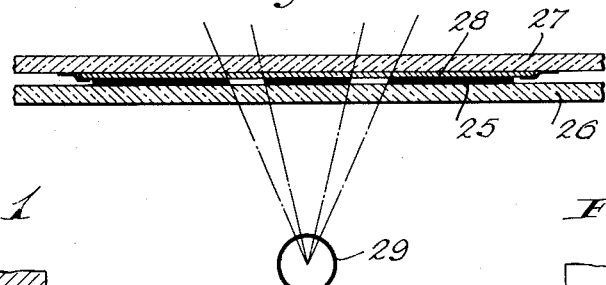
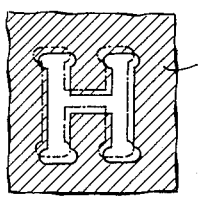
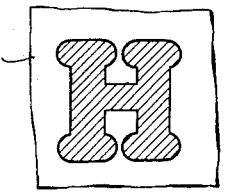
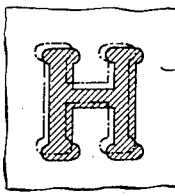
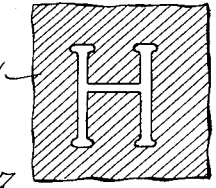
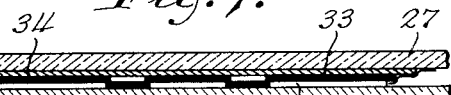
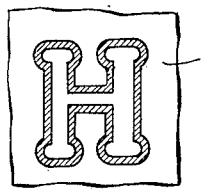
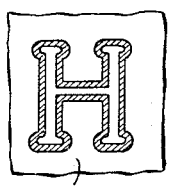
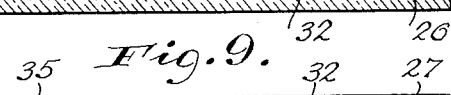
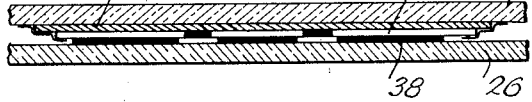
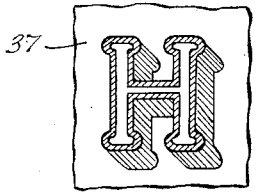
INVENTOR.
MARTIN J. WEBER
BY Mueller + Ruhl
ATTORNEYS

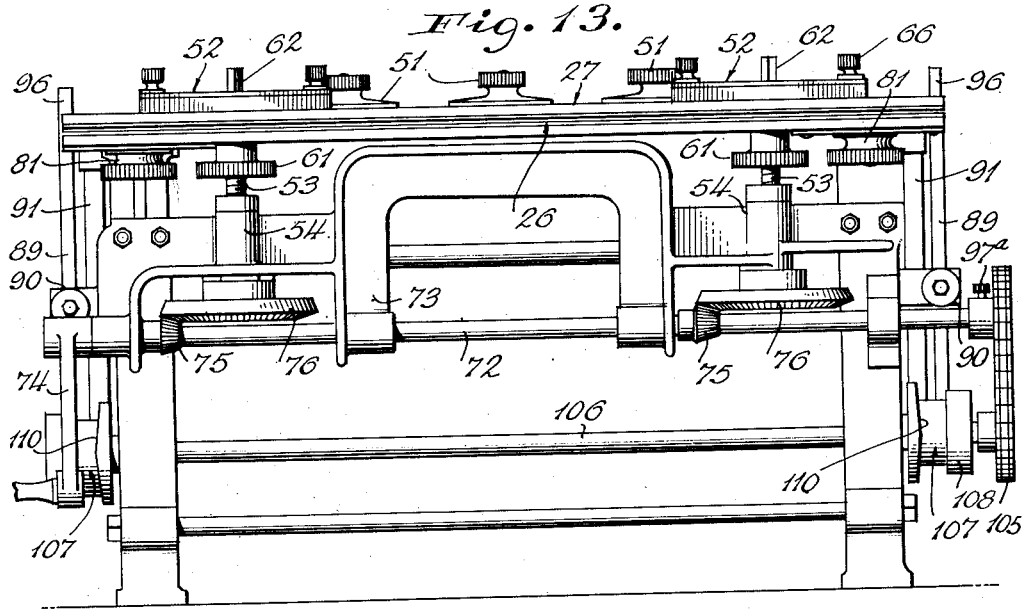
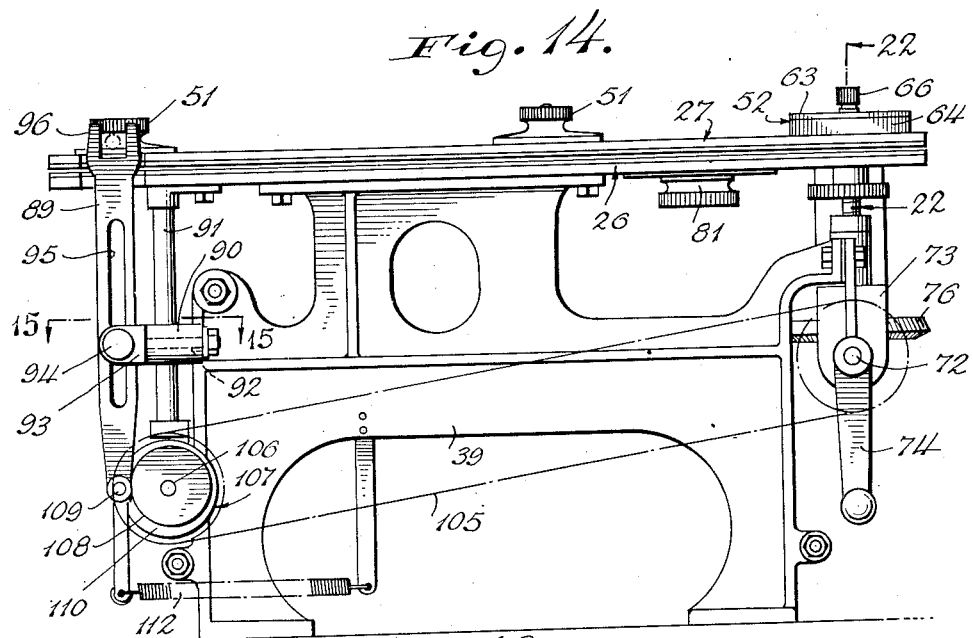
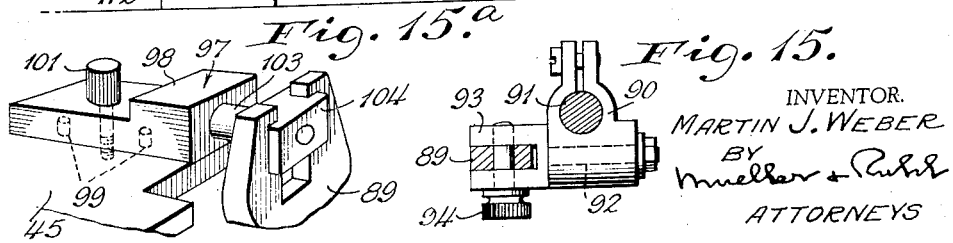

INVENTOR.
MARTIN J. WEBER
BY Mueller & Ruhl
ATTORNEYS

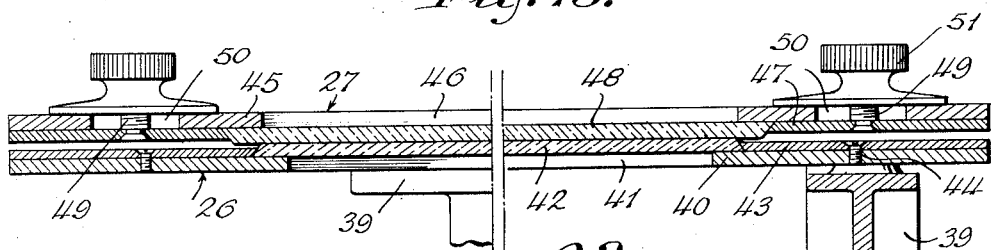
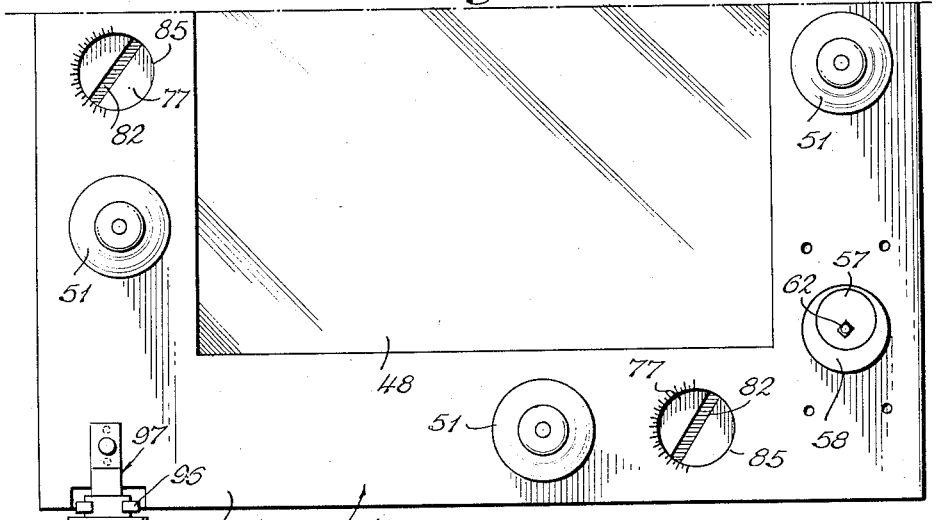
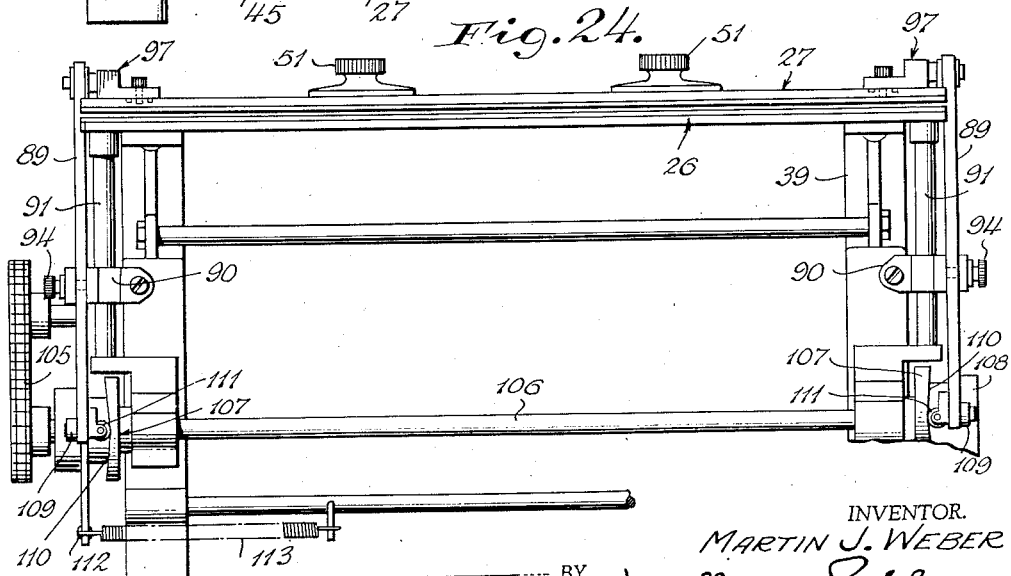

June 16, 1942.  M. J. WEBER  2,286,883
PHOTO-MECHANICAL APPARATUS
Original Filed Dec. 21, 1938   5 Sheets—Sheet 5

INVENTOR.
MARTIN J. WEBER
BY
ATTORNEYS

Patented June 16, 1942

2,286,883

UNITED STATES PATENT OFFICE 2,286,883

PHOTOMECHANICAL APPARATUS

Martin J. Weber, New York, N. Y.

Original application December 21, 1938, Serial No. 247,021. Divided and this application July 10, 1940, Serial No. 344,643

6 Claims. (Cl. 95—73)

This invention relates to improvements in photo-mechanical apparatus and this application is a division of my copending application Serial No. 247,021, filed December 21, 1938.

The apparatus of the present invention has an especial application in the graphic arts wherein, heretofore, it has been the practice to produce variations in the characteristics of an original copy, such as line work for example, which variations include many effects such as thickening, thinning, outlining, shading or shadowing. The procedure usually followed in making such variations has been to furnish a skilled artist with an original copy from which he manually prepares a new drawing with the desired variations of the original embodied therein. Obviously, this is a tedious and time consuming operation, aside from the attendant expense of production. Another method, infrequently used, is to prepare a photographic film of an original copy and produce successive exposures of said film upon a sensitized sheet, with one or the other of said elements being shifted with respect to the other between exposures, so that the image printed on said sheet will embody a variation of the original, such as a shadowing or shading effect. However, such a method is unsatisfactory for various reasons, principal among which are the difficulty of obtaining the proper degree and accuracy of adjustment of the film or sheet between exposures, and the limitations in variations capable of being produced by such a method.

In accordance with the present invention, it is proposed to overcome the many difficulties inherent in the known methods mentioned, by the provision of an apparatus which will permit of rapidly and accurately producing, from a single original copy, many different and separate variations in the appearance of the original. Such apparatus basically involves the projection of an image of an original copy upon a sensitized sheet and, during the course of such projection, producing between said copy and sheet relative, controlled movements so that there is exposed on said sheet the desired variations of the original characteristics of said copy.

The inventive idea involved is capable of receiving a variety of expressions one of which, for purposes of illustration only, is shown in the accompanying drawings; but it is to be expressly understood that said drawings are used merely for the purpose of illustrating the invention as a whole, and not to define the limits thereof, reference being had to the appended claims for this purpose.

In the drawings:

Figure 1 is a fragmentary plan view of a negative film prepared from an original drawing or the like, which is to be used in the apparatus herein described for the production of a photographic copy of the original, with predetermined variations, the dotted lines in said figure indicating relative movements between said film and sensitized sheet upon which the said photographic copy is to be made, said movements being designed to produce a thickening of the original copy.

Figure 2 is a diagrammatic view illustrating two supports of the apparatus used in carrying out the present invention, between which supports are positioned the negative film of Fig. 1 and a sensitized sheet so that when one of said supports is moved relative to the other the proper exposure on the sensitized sheet will be produced.

Figure 3 is a fragmentary plan view of the sensitized sheet in the form of a positive print showing the result of the operation of Fig. 2.

Figure 4 is a view similar to Figure 1, the copy in this instance, being a positive of the original and being employed to produce a thinning effect in the character or picture shown on the original.

Figure 5 is a view similar to Figure 2 showing the positive copy of Figure 4 in association with the sensitized sheet.

Figure 6 is a plan view of the sensitized sheet in the form of a negative print, showing the result of the operation in Figure 5.

Figure 7 diagrammatically shows the apparatus as it is employed when it is desired to outline the interior of an original character or the like, the negative of Figure 1 being, in this instance, superimposed upon a positive print of the original so that when relative movements are produced between the positive on the one hand, and the negative and a sensitized sheet on the other hand, the exposure on the latter will produce an interior outline of the original.

Figure 8 is a plan view showing the result of the operation of Figure 7.

Figure 9 diagrammatically shows the position of parts when it is desired to outline the exterior of the character, the positive copy being then superimposed upon the negative.

Figure 10 is a view similar to Figure 8 showing the result of the operation in Figure 9.

Figure 11 shows the position of the parts as in Figure 7 from which a shading or shadowing effect may be produced by a definite reciprocating movement of one of the supports of the apparatus relative to the other.

Figure 12 is a view illustrating the result obtained by the operation in Figure 11.

Figure 12 is a front elevation of the apparatus embodying the features of the present invention.

Figure 14 is a side view thereof.

Figure 15 is a section on the line 15—15 of Figure 14.

Figure 15A is a fragmentary perspective view of a control means, shown at the left of Figure 14, utilized for imparting a rectilinear movement of one of the supports of the apparatus relative to the other.

Figure 16:
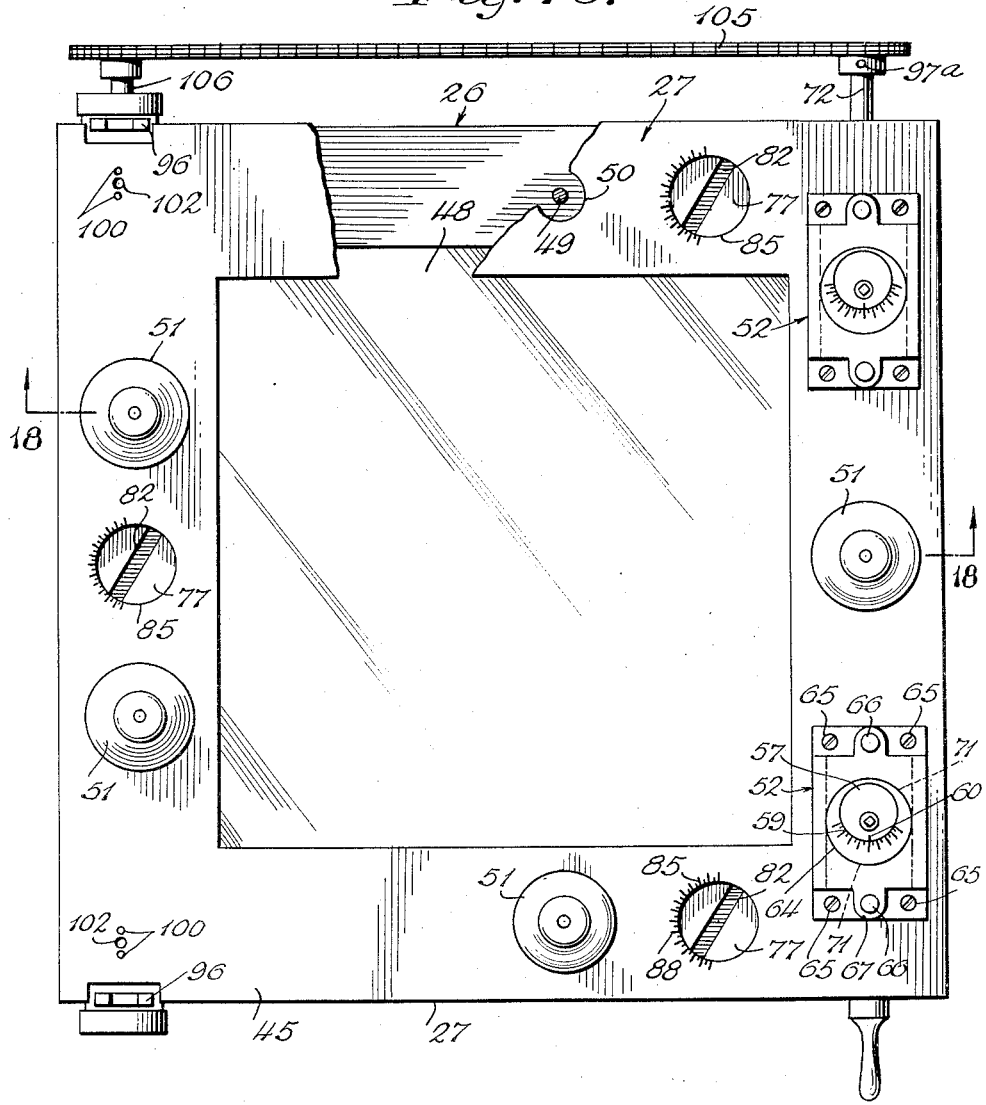

Figure 16 is a top plan view, partly broken away, of the apparatus when employed for imparting a rotary movement of one support relative to the other.

Figure 17:
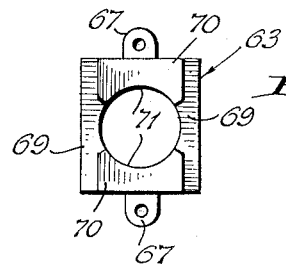

Figure 17 is a bottom plan view of a removable bearing block employed in association with a control device used in obtaining the rotary movement of the support, said block being removable when it is desired to obtain a different movement of said support.

Figure 18 is a transverse section on the line 18—18 of Figure 16.

Figure 19:
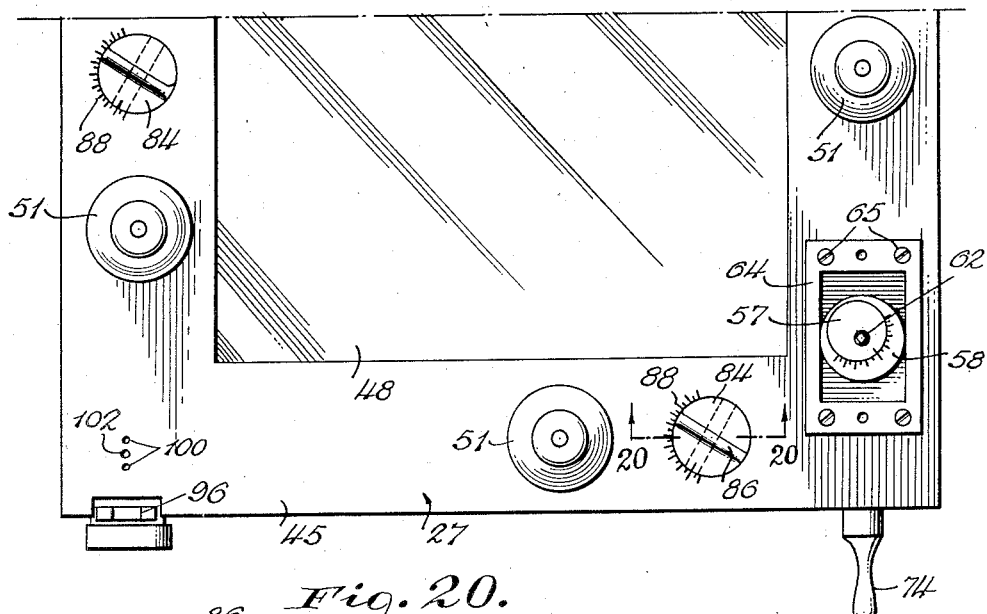

Figure 19 is a fragmentary top plan view, with the block of Figure 17 removed from each control device and other instrumentalities applied in association with the two supports for producing a relative reciprocating movement therebetween.

Figures 20, 21:
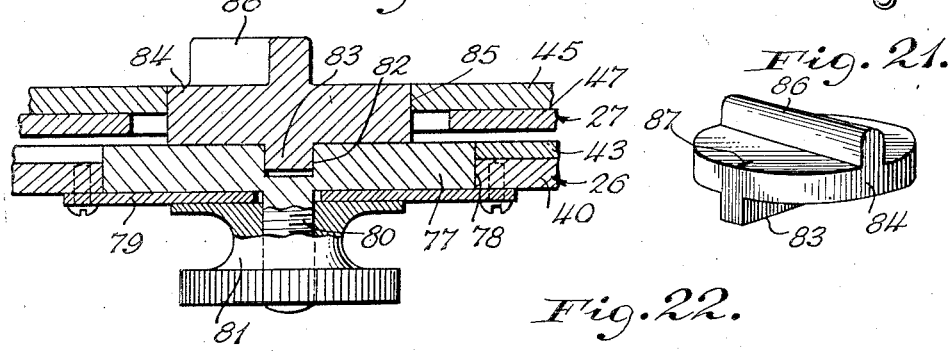

Figure 20 is a section on the line 20—20 of Figure 19.

Figure 21 is a perspective view of a guide member utilized in producing the reciprocating movements of one of the supports.

Figure 22:
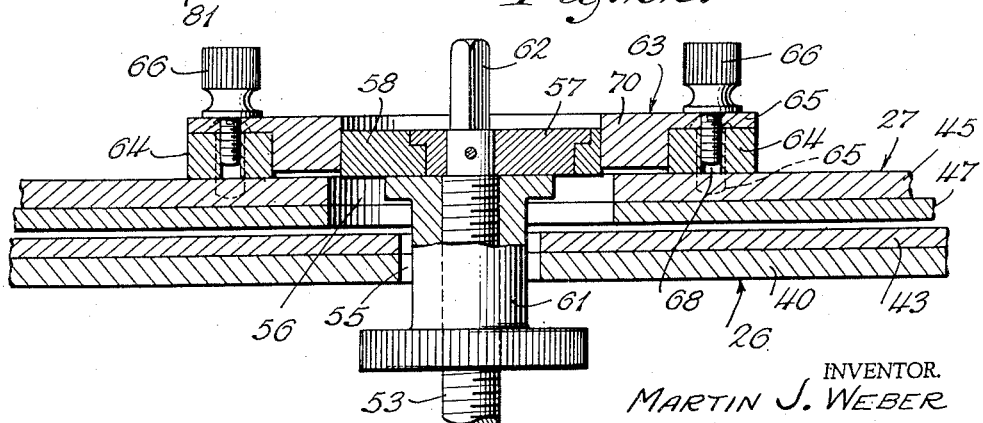

Figure 22 is a section on the line 22—22 of Figure 14 showing details of construction of one of the control devices.

Figure 23 is a fragmentary top plan view showing the arrangement of parts when one of the supports is moved along a rectilinear path relative to the other, and Figure 24 is a rear view of the apparatus taken at right angles to Figure 14 and principally illustrating the mechanism for producing said rectilinear movements.

Reference will first be had to Figures 1 to 12 which illustrate, diagrammatically, some of the basic variations capable of attainment with the present apparatus. In its application to the graphic arts, the uses of the apparatus herein involved are manifold. As a concrete example of one type of work to which the apparatus is adapted, the invention is illustrated in its application to lettering, but it will be obvious from an understanding of the invention as herein disclosed, that the same is equally capable of effecting a photo-mechanical metamorphosis in drawings and designs of various kinds. Also, an important feature is the ability to prepare negatives for the engraver or lithographer in two or more colors for perfect register from a solid, single-color original line copy, without guide lines, thereby eliminating the necessity of following the usual practices of preparing complicated key drawings for multiple color work, and in spending the time involved in painting overlaps for proper register. The apparatus may also be employed for the reproduction of designs for rollers used in textile printing.

A simple example, such as the letter H, is employed herein as an illustration of line work capable of being varied by thickening, thinning, outlining, shading, or shadowing the lines of the original in the production made therefrom, when practicing the method to be hereinafter described.

Following the preparation of an original drawing, such as an ordinary block type letter, or group of such letters, or any other type of line drawing, the characteristics of which are to be changed in accordance with the present method, photographic negative and positive copies of such originals are prepared, which are hereinafter generally referred to as the original copy. However, should the original have the quality of transparency, it may be employed instead of said photographic films. Wherever the term "film" is herein employed, it is to be understood as referring broadly to a sheet portions of which may be transparent and other portions opaque. Depending upon the type of variation of the original to be effected, either the negative or the positive copy, or both, are employed. Thus, in Figures 1 to 3, wherein the process of thickening the letter H is illustrated, a negative 25 of the original is used. Figure 1 shows the letter in its original state, with the dotted lines indicating the relative movement which accomplishes the ultimate thickening of the letter as shown in Figure 3. To attain this result, there is diagrammatically illustrated in Figure 2, two supports 26 and 27, both of which, generally speaking, may be in the form of glass plates. In the thickening process, the negative copy 25 is secured to the upper surface of the lower support 26 which, in the apparatus as illustrated, is stationary; while to the undersurface of the upper support 27, which is movable relative to the lower support, there is secured a sensitized sheet 28 upon which an image of the original copy is to be exposed by projecting light from a source 29 through the lower glass support 26 and the clear or transparent spaces of the negative 25. The controlled movement to be imparted to the support 27 for the purpose of thickening the image on the sensitized sheet, is a rotary one, as indicated by the dotted lines in Figure 1. Therefore, as the support 27 and the sensitized sheet 28 are rotated relative to the negative film 25 it will be apparent that a greater area of the sheet is exposed through the clear spaces of the negative and consequently the sheet 28 will contain a print of the original copy, in a thickened state, as shown on the positive print in Figure 3.

In Figures 4 to 6, there is illustrated the process of preparing from a positive copy of an original, a negative print thereof in which the character on said copy is altered by thinning the same. In accomplishing this purpose, the positive copy 30 is secured to the lower stationary support 26 and the sensitized sheet 31 super-imposed upon said copy by attaching said sheet to the upper movable support 27. Again, the support 27 is rotated and in so doing the light from the source 29 passes through the clear or transparent portions of the copy 30. As the rotation of the support 27 and sheet 31 progresses the portions of said sheet directly above the marginal edges of the opaque portions of the copy 30 are projected beyond said marginal edges and become exposed to the light source 29 so that, in effect, there will remain unexposed on the sheet 31 an area which is narrower in width than that of each of the corresponding opaque portions of the copy 30, the width of said unexposed portions depending upon the degree of rotation of the support 27, which as will be seen from the following description of the apparatus, may be regulated. After the sensitized sheet 31 has been rotated a sufficient time to secure proper exposure the result, as shown in Figure 6, is a negative print of the original copy with the character thinned.

To produce an interior outlining of a drawing, both negative and positive copies of said drawing are employed, as shown in Figure 7. The interior outlining of the original is produced by securing the positive copy 32 to the lower stationary support 26 while the negative copy 33 is secured to the movable support 27. The support 27, with the negative 33 attached, is then adjusted before exposure takes place, until the transparent portions of the negative are in register with the opaque portions of the positive. The sensitized sheet 34 is then inserted between the undersurface of the support 27 and the negative 33. The copies are then exposed to the light source 29 and through the controlled rotary movement of the support 27, to be later described, the transparent portions of the negative are offset relative to the opaque portions of the positive thus permitting the light to pass through the offset portions of said negative and onto the sensitized sheet 34 where an outline image of an original character is formed as shown in Figure 8. By interiorly outlining the original character, the over-all dimension of the copy produced on the sheet 34 relative to the original is maintained.

Should it be desired to outline the exterior of the character, the procedure illustrated in Figure 9 is followed. In this instance, the negative 33 is attached to the stationary support 26 while the positive 32 and the sensitized sheet are secured to the movable support 27, thus reversing the positions of the negative and positive as described in connection with Figure 7. After securing registry of the opaque and transparent portions of the copies 32, 33 the support 27 is again rotated and, in so doing, light from the source 29 will penetrate the negative and positive and reach the sheet 35 between the marginal edges of the transparent portions of the negative 33 and the opaque portions of the positive 32 when the latter is offset relative to the negative. The result, as shown in Figure 10, is that the sheet 35 contains an exposure in which the original character has its marginal edges exteriorly outlined.

In the variations thus far described, the support 27 has been rotated. The same results may be obtained by moving the support along a rectilinear path, as will be hereinafter described. Where the characters or other drawing of the original are comparatively large, it may be more desirable to move the support through a rectilinear path since, through this method, any angles produced in the printing of the sensitized sheet will be better defined than when the support is rotated. In the latter instance, with comparatively large characters, the angles or corners produced will appear slightly rounded, but the rounding of such corners or angles will be hardly discernable where the characters are small.

In Figures 11 and 12 there is shown a method of shadowing and outlining an original character or copy. To produce this result, there is mounted upon the upper movable support 27 a positive copy 36 in which the character thereon is thinned as in Figure 6, with the sensitized sheet 37 interposed between said copy and the undersurface of said support. A negative 38 is secured to the lower support 26. The positive 36 may be obtained by first producing a negative in the manner described in connection with Figures 4 to 6, and then preparing a positive from the negative 31 shown in Figure 6. Thus, when the positive 36 is placed above the negative 38, as in Figure 11, with the opaque portions of the positive centered with respect to the transparent portions of the negative, the light from the source 29 will pass through the registered transparent portions of the two copies 36, 38 and onto the sensitized sheet 37 to produce an outlined image on said sheet. When shadowing, the support 27 has imparted thereto, as will later appear, a reciprocating movement. This movement is usually diagonal with respect to the horizontal so as to follow the customary procedure in shadowing work. The adjustment for the support 27 is made so that when the elements are in the position of Figure 11 and is desired to form the shadowing to the right of the outlined character, said support is in the extreme left hand position of its reciprocating movement. Thus, when the movement of the support 27 is started the same will move from the position of Figure 11 to the left and back again thus increasing the exposure on the sheet 37 between the right hand marginal edges of the opaque and transparent portions of the positive 38 and negative 36, respectively. When the exposure is completed the original character will be altered on the sheet 37 as shown in Figure 12.

Reference is now had to Figures 13 to 24 for a disclosure of a preferred form of apparatus embodying novel features for carrying out the invention. Generally, the apparatus comprises the frame 39 adapted to be mounted upon any suitable support above the light source 29 so that the rays of light from said source are projected upwardly at the approximate center of the machine so as to be cast upon the glass plate of the lower support 26. This support is affixed in a horizontal position to the upper portion of the frame 39 and, as best illustrated in Figure 18, comprises a base plate 40 having a center opening 41 therein. Superimposed upon said plate 40 directly over the opening 41 and overlapping the edges of the latter is the transparent plate 42 which may be made of glass. This latter plate is retained in position by a rectangular frame 43 which is secured to the plate 40 by means of screws 44, the inner edge of the frame 43 and perimeter of the plate 42 being beveled so that said plate will be retained in position by the frame. It is on the upper surface of the transparent plate 42 that the negative or positive copy, whichever the case may be in the various procedures above described, is secured as one of the preliminary steps in the method.

The upper support 27 comprises the plate 45 having the central opening 46 therein and with which is associated the retaining frame 47 held against the undersurface of the plate 45 and adapted to retain in position the glass plate 48 which is centered with respect to the opening 46 in the plate 45. In carrying out the method, it is not essential that the upper support embody the glass plate 48, but this plate is used as a matter of convenience in preliminarily bringing the positive and negative copies into register as described in connection with the methods of Figures 7, 9, and 11. In order that adjustments of the plate 48 may be made for the latter purpose, the retaining frame 47 and plate 48 are held in association with the plate 45 in such manner that the former may be adjusted relative to such plate 45. To this end, the means that connect the plate 45 and frame 47 comprises a number of screws 49 riveted or otherwise fixed at their lower ends in said frame 47 and extending upwardly through openings 50 formed in the plate 45. Threaded upon each of the screws 49 is a clamping nut 51 having a base of larger diameter than the opening 50 so as to engage the portion of the plate 45 surrounding said opening to thereby clamp together said plate and the frame 47 after the glass plate 48 has been adjusted to the desired position. This adjustment involving the movement of the frame 47 and glass plate 48 relative to the plate 45, is accomplished by first loosening the various nuts 51 and then making the necessary adjustment of the plate 48 by grasping any two of said nuts and shifting the frame 47 within the range of movement provided by the openings 50. The movable support 27 may be lifted bodily from its superimposed position above the support 26 for the purpose of attaching to the underside of the plate 48 a negative or a positive copy and the sensitized sheet, after which said support is placed in its operative position as shown in Figure 18 with the plate 48 resting upon the plate 42. Thereafter, the minute preliminary adjustments of the plate 48 necessary to obtain registry of the negative and positive copies, may be accomplished.

The portion of the apparatus utilized in effecting a rotary movement of the support 27 relative to the support 26 will first be described and, in this connection, reference is made to Figures 13 to 17 and Figure 22. Said rotary movement is transmitted to the support 27 through the intermediary of two control devices generally indicated by the numeral 52 (Figure 16) both of which devices are arranged along one side of the support 27. As these devices are identical in construction, a description of one will suffice.

By particular reference to Figure 22 it will be seen that each device comprises a vertically disposed screw member 53 which extends upwardly from a bearing 54 (Figure 13) in the main frame 39, and through openings 55 and 56 in the supports 26 and 27, respectively. Secured to the upper portion of the screw member 53 above the level of the upper surface of the support 27 is an inner circular cam member 57 and embracing said member is an outer circular cam member 58. These two cam members 57, 58 are utilized for the purpose of transmitting the desired rotary movement to the support 27 and the cam 58 is adjustable about the cam 57 to regulate the amount of each movement. For this purpose the upper surface of the cam 58 is provided with a series of graduations 59 about a portion of the inner edge of said surface, and a single pointer 60 is marked on the periphery of the upper surface of the cam 57. While in operation, the two cam members are held together as a unit by a clamping nut 61 threaded upon the screw 53 and bearing against the under surface of said cam members, as in Figure 22. However, when an adjustment of the support 27 is to be made, the nut 61 is threaded downwardly so as to disengage from the cam members, a key (not shown) is placed over the square head 62 of the screw 53 so as to hold the cam 57 stationary, and the cam 58 is then turned, by hand, relative to the cam 57 to the proper degree as defined by the graduations 59. When the proper adjustment of the cam 58 has been attained the nut 61 is again threaded upwardly into its operative position in contact with the under surface of the cam members, whereupon the latter will rotate as a unit when power is transmitted to the screw 53, as will hereinafter appear.

When the cam member 58 is being adjusted, its periphery contacts at opposite points with a bearing block 63 and also with opposite sides of a rectangular frame 64 (Figure 16), both of the latter elements constituting a part of the control device 52. The frame 64 is removably secured to the upper surface of the plate 45 of the movable support 27 by means of screws 65 and the bearing block 63 is, in turn, removably secured to the end members of the frame 64 by set screws 66 extending through ears 67 at the ends of said block and engaging with screw threaded openings 68 formed in the frame 64. The bearing block 63 is best shown in Figure 17 as comprising two side flanges 69 which rest upon the side members of the frame 64, and the central portion of said block consists of the two bearing sections 70 which extend downwardly into said frame 64 and have opposed arcuate bearing surfaces 71 adapted to engage opposite portions of the cam member 58. As previously stated, opposite points of the cam 58 also contact with the side members of the frame 64 so that as the cams are rotated as a unit, the desired degree of rotation will be imparted to the support 27 to secure results as described in connection with Figures 2, 5, 7 and 9. During this rotary movement, certain instrumentalities used in conjunction with the support 27 and in cooperation with the control devices 52 to effect the reciprocating and rectilinear movements of the support 27, are removed from association with the apparatus.

The rotation of the two screws 53 of the control device is accomplished through an operating shaft 72 mounted in a bearing portion 73 of the main frame 39 and having mounted on one of its projecting ends the operating handle 74 which may be turned by the operator to transmit rotation to said shaft. A pinion 75 for each of the devices 52 is carried by the shaft 72 and meshes with a beveled gear 76 secured to the lower end of the associated screw 53 so that as the shaft 72 is rotated a similar movement will be imparted to said screws.

The mechanism for effecting a reciprocating movement of the support 27 will now be described. To accomplish this movement, the bearing block 63 must first be removed from each of the control devices 52, as shown in Figure 19. When so removed, the cam member 58 will only engage the side members of the frame 64 so that rotation of said cam will only impart a sidewise movement to the support 27, as viewed in Figure 19. With the bearing block 63 and its bearing portions 70 removed from the frame 64, a clear space is provided between the cam member 58 and each of end member of the frame 64 so that the support 27 will be free to move in an endwise direction with regard to said frame 64 under the control of a guiding means now to be described which, in association with the cam member 58, will translate the rotary movement of the latter into a reciprocating movement of the support 27. Said guiding means is best illustrated in Figures 20 and 21 and provision is made for the inclusion of three of such means in the apparatus as indicated in Figure 16. Each of said means consists of a guide disc 77 disposed within an opening 78 formed in the lower support 26 and held in position therein by a plate 79 secured to the under surface of said support. Depending from the center of the disc 77 is a screw 80 which receives thereon a clamping nut 81 adapted to engage the under surface of the plate 79 to fasten the disc 77 in various rotative adjusted positions. The upper surface of the disc 77 is provided with a diametrically extending groove 82 which is adapted to receive the rib 83 of a disc-like guide key 84 removably positioned in an opening 85 formed in the upper support 27. A projection 86 extending from the upper surface of the key 84 provides a handle by means of which the key may be manipulated. A pointer or other mark 87 on the edge of the upper surface of the key 84 is utilized in conjunction with a series of graduations 88 formed about the periphery of the opening 85 to secure a rotative adjustment of the disc 77 and consequent disposition of its guide groove 82 so as to obtain the desired direction of reciprocating movement of the support 27. The adjustment of the disc 77 may be effected through a range of less than 180 degrees so that the guide groove 82 may be disposed in a horizontal position or in a diagonal position with respect to the horizontal. If in a horizontal position, the support 27 will merely be reciprocated sidewide by the rotation of the cam 58 but when said groove is disposed diagonally as indicated in dotted lines in Figure 19, the support 27 will be caused to move along a path coincident with the directional disposition of said guide groove. When making the adjustment of the disc 77 the clamping nut 81 is first threaded downwardly and the key 84 then inserted into the opening 85 with the rib 83 engaged in the groove 82. The disc 77 now being free to turn, the key 84 is rotated by means of its handle 86 until the pointer 87 registers with the desired graduation 88. The clamping nut 81 is then threaded upwardly against the plate 79 to clamp the disc 77 in its adjusted position. The handle 74 may now be operated to transmit rotation to the cam 58 and due to the contact of said cam with the side members 64 and the engagement of the rib 83 in the groove 82, a resultant reciprocating movement will be imparted to the support 27 to produce the effect desired in connection with Figures 11 and 12.

The mechanism, principally shown in Figures 13 to 15A, 23 and 24, for accomplishing the rectilinear movement of the support 27 will now be described. During the rotary and reciprocating movements of said support, said mechanism is inactive due to the removal of parts thereof which join the drive to the support, as will presently appear. The rectilinear movement of the support is effected through the use of two oscillating levers 89 each mounted at the rear of the machine for pivotal movements about two axes at right angles to each other. The mounting for each lever comprises a slide 90 movable to different adjusted positions upon a vertical bar 91 secured in the frame of the apparatus. One of the axes of each lever 89 is the stub shaft 92 rockingly supported in the slide 90, and the outer end of said shaft carries a bifurcated head 93 through which extends the other axis of oscillation of the lever 89 in the form of a screw 94 which projects through an elongated slot 95 in said lever. Through the medium of this construction it will be obvious that the amount of movement of the upper end of the lever, which governs the degree of movement of the support 27, may be regulated by shifting the slide 90 vertically on the bar 91 so as to alter the position of the axis about which the lever 89 oscillates. The upper end of each lever 89 is bifurcated as indicated at 96 for operative engagement with a connector generally indicated by the numeral 97. This connector is removably attached to the plate 45 of the support 27, and when said support is being rotated or reciprocated the connector is detached from said plate so that the associated lever 89 will be inoperative to transmit any motion to the support 27. Also, the driving means for the levers 89, later to be described and originating at the drive shaft 72, is disconnected from said levers by loosening the set screw 97A at the front end of said shaft so that the latter will turn without transmitting power to said lever driving means. In order to render the cams 57, 58 ineffective to produce any rotary movement of the support 27 when the rectilinear movement is to be accomplished, the frame 64 of each of the control devices 52 is detached from the plate 45, and to prevent the reciprocating movement of said support the keys 84 are removed from the recesses 85 in said plate, as shown in Figure 23.

When attached for operation, the block 98 of the connector is disposed on top of the plate 45, with dowel pins 99 engaging in openings 100 (Figure 16) and a set screw 101 is threaded into an opening 102 to secure said block in position. Projecting from one end of the block adjacent the upper end of the lever 89, is a stud shaft 103 which rockingly supports a guide 104 grooved on its opposite vertical edges to receive the arms of the bifurcation 96 of the lever 89 so that as the latter is oscillated successively in different planes at right angles to each other such action will be translated into a rectilinear movement of the support 27.

The drive for the levers 89 originates at the shaft 72 extending across the front of the machine and power is transmitted therefrom, through the endless element 105, to the cam shaft 106 extending across the rear of the machine. At each end of the latter shaft the same carries a double cam element 107 in association with the adjacent lever 89. Each cam element 107 includes a cam surface 108 engageable with a roller 109 at the lower end of the associated lever 89 and operates to rock said lever about the pivot 94. Also included in said element 107 is a second cam face 110 engageable with a roller 111 (Figure 24) mounted at the lower end of the lever 89 whereby to rock said lever about its pivot 92, the arrangement of the cams 108 and 110 relative to each other being such that each becomes effective to rock the lever 89 in the proper direction at the conclusion of the rocking movement of said lever under the control of the other cam, so that the upper effective end of the lever 89 will describe a rectilinear path for similarly moving the support 27.

The rollers 109 and 111 at the lower end of each of the levers 89 are held against their respective cam surfaces by the coil springs 112 and 113 connecting said lever with the frame of the machine.

What is claimed is:

1. In a photo-mechanical apparatus, a light-permeable support upon which a film of an original copy is adapted to be mounted, a second support mounted in juxtaposition to the first named support and adapted to carry a sensitized sheet, means including cam elements operable upon one of said supports to move the same relative to the other support along a predetermined circular path, and means engageable with both of said supports to translate the circular movement produced by said cam elements into a reciprocating movement of said movable support.

2. In a photo-mechanical apparatus, a light-permeable support upon which a film of an original copy is adapted to be mounted, a second support mounted in juxtaposition to the first named support and adapted to carry a sensitized sheet, an oscillatory member connected to one of said supports for moving the same relative to the other support, means to mount said oscillatory member for movements in paths perpendicular to each other, and cam means for operating said oscillatory member.

3. In a photo-mechanical apparatus, two supports mounted in superposed relation with one of said supports movable relative to the other, control devices carried by said movable support and each including a frame having opposed parallel side members, a rotatable cam engageable with said side members and operable to impart reciprocating movements to said frame, means to directionally guide said frame in its reciprocating movements, said means comprising a guide disc rotatably mounted in said other support and having a diametrically extending groove in a face thereof, a guide key mounted in said movable support and having means to engage in said groove to rotate said guide disc to various positions to control the direction of the reciprocating movements of said frame, means to secure said guide disc in an adjusted position, and means to rotate said cam.

4. In a photo-mechanical apparatus, two supports mounted in superposed relation with one of said supports movable relative to the other, control devices carried by said movable support and each including a rectangular frame having side and end members, a removable bearing block attached to said end members and having opposed bearing surfaces, an adjustable cam disposed in said frame and engaging the side members thereof and also the bearing surfaces of said block to impart a rotary movement to said movable support when said cam is rotated, a stationary cam eccentric to said adjustable cam and about which the latter is adjustable to vary the degree of rotation of said movable support, a screw member carrying said stationary cam, a nut on said member and engaging said cams to fix them in relatively adjusted relation to each other, and means to rotate said screw member to impart unitary rotation to said cams to thereby rotate said movable support.

5. In a photo-mechanical apparatus, a main frame, a stationary support carried by said frame, a movable support cooperating with the first support, a connector device mounted on said movable support and including a guide, means to impart a rectilinear movement to said support, said means including an oscillating lever carried by said main frame and having engagement with said guide, a mounting for said lever having two pivots therefor arranged at right angles to each other whereby said lever may be oscillated in different planes, and means to alternately oscillate said lever in different planes to cause said support to traverse a rectilinear movement through engagement of said lever with said guide.

6. In a photo-mechanical apparatus, a main frame, a stationary support carried by said frame, a movable support cooperating with the first support, a connector device mounted on said movable support and including a guide, means to impart a rectilinear movement to said support, said means including an oscillating lever carried by said main frame and having engagement with said guide, a guide bar supported in said main frame, a mounting for said lever slidable on said guide bar and provided with two pivots for said lever arranged at right angles to each other with one of said pivots having a slotted connection with said lever to permit of adjustment of said mounting along said bar to vary the amount of oscillatory movement of said lever, a driven element having two cams engageable with said lever to alternately oscillate the same about said pivots.

MARTIN J. WEBER.